United States Patent
Doring (10) Patent No.: US 6,280,601 B1
(45) Date of Patent: *Aug. 28, 2001

(54) ELECTROLYTIC METHOD FOR STERILIZATION OF MICROORGANISMS AND/OR MINERALIZATION OF ORGANIC AND/OR INORGANIC SUBSTANCES IN GROUND SOIL

(76) Inventor: Falk Doring, Burghaldenweg 51, Stuttgart (DE), D-70469

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/053,498

(22) Filed: Apr. 2, 1998

Related U.S. Application Data (63) Continuation-in-part of application No. 08/607,076, filed on Feb. 26, 1996, now Pat. No. 5,738,778.

(30) Foreign Application Priority Data

Feb. 28, 1995 (DE) .............................................. 195 06 911

(51) Int. Cl.$^7$ ...................................................... C02F 1/461
(52) U.S. Cl. ...................... 205/701; 205/744; 205/758; 205/761; 205/766; 588/204
(58) Field of Search .................................. 205/701, 744, 205/758, 761, 766; 588/204

(56) References Cited

U.S. PATENT DOCUMENTS

| | | |
|---|---|---|
| 3,752,747 | 8/1973 | Treharne et al. . |
| 4,383,901 | 5/1983 | Smith et al. .......................... 204/152 |
| 4,479,857 | 10/1984 | Barton, Jr. . |

(List continued on next page.)

FOREIGN PATENT DOCUMENTS

| | | |
|---|---|---|
| 150328 | 5/1903 | (DE) . |
| 383481 | 10/1923 | (DE) . |
| 383491 | 10/1923 | (DE) . |
| 397551 | 6/1924 | (DE) . |
| 397888 | 6/1924 | (DE) . |
| 423822 | 3/1926 | (DE) . |
| 463333 | 10/1928 | (DE) . |
| 36 00 772 | 7/1987 | (DE) . |
| 39 20 342 | 8/1990 | (DE) . |
| 40 07 805 | 9/1991 | (DE) . |
| 40 13 068 | 10/1991 | (DE) . |

(List continued on next page.)

*Primary Examiner*—Arun S. Phasge
(74) *Attorney, Agent, or Firm*—Jacobson, Price, Holman & Stern, PLLC (57) ABSTRACT

This invention relates to a method for sterilizing microorganisms and/or decomposing organic and inorganic pollutants in a region of ground soil by passing a specified direct current through the contaminated soil region with a controlled voltage applied between at least one pair of electrodes incorporated into the ground soil. For decomposition of the organic and inorganic pollutants, it is postulated that the applied electric field increases the natural capacitance of the individual soil particles to over capacitance sufficient to cause the soil particles to discharge electrons. This electric discharge, in turn, provides the reaction energy to promote the redox reactions which effects decomposition of the pollutants. The voltage is preferable controlled to optimize the amplitude and frequency of the electric discharges emitted by the soil particles which have become subject to over capacitance. Preferably, the applied electric field is aligned with the natural electric field of the soil particles being treated. A voltage of at least 0.4 V to 2 V per meter of electrode distance for each pair of electrodes is required.

60 Claims, 3 Drawing Sheets

U.S. PATENT DOCUMENTS

| | | |
|---|---|---|
| 4,758,318 | 7/1988 | Yoshida . |
| 4,983,267 | 1/1991 | Moeglich et al. ................. 204/182.4 |
| 5,074,986 | 12/1991 | Probstein et al. ..................... 204/130 |
| 5,137,608 | 8/1992 | Acar et al. . |
| 5,281,312 | 1/1994 | Woodside . |
| 5,595,644 | 1/1997 | Doring et al. ........................ 205/766 |
| 5,738,778 * | 4/1998 | Doring ................................. 205/701 |

FOREIGN PATENT DOCUMENTS

| | | |
|---|---|---|
| 43 01 270 | 1/1994 | (DE) . |
| 43 15 248 | 11/1994 | (DE) . |
| 195 06 911 | 4/1996 | (DE) . |
| 0 312 174 | 4/1989 | (EP) . |
| 0 729 796 | 9/1996 | (EP) . |
| WO 93/09888 | 5/1993 | (WO) . |

* cited by examiner

ELECTROLYTIC METHOD FOR STERILIZATION OF MICROORGANISMS AND/OR MINERALIZATION OF ORGANIC AND/OR INORGANIC SUBSTANCES IN GROUND SOIL

RELATED APPLICATION

This application is a continuation-in-part of my earlier application, U.S. Ser. No. 08/607,076, filed Feb. 26, 1996 now U.S. Pat. No. 5,738,778, issued Apr. 14, 1998.

FIELD OF THE INVENTION

This invention relates to a process for the sterilization of microorganisms and for the mineralization of organic and inorganic substances in soils and/or in ground water by means of a direct electric current applied to at least one pair of electrodes incorporated into a region of soil.

BACKGROUND OF THE INVENTION

In microbiological processes related to soil remediation the destruction of organic pollutants by microorganisms is furthered by the cultivation and selection of specialized microorganisms with the objective of an improved performance (mutagenesis with predominantly chemical mutagens) which thereafter are fed back into the ground. The central problem of mutagenesis is that mutagenesis can only be controlled during the stage of cultivation. Once the microorganisms are fed back into the ground, ongoing mutagenesis in soils is almost impossible to control. An uncontrolled mutagenesis in a milieu of pollutants, such as pigments, solvents, pesticides etc. can produce mutants, which might be carcinogenic and/or embryotoxic and/or pathogenic.

A second problem is encountered in soil areas where pathogenic microorganisms can be expected to an increased extent. Reference is made to plants disposing of animal bodies, tanneries, and fur treatment plants which are already affected by pathogenic microorganisms such as the anthrax (*Bacillus anthracis*) as well as to abattoirs and farms. In these cases, the problem arises because during microbiological remediation of pollutants the growth of pathogenic microorganisms also simultaneously furthered.

A third problem area can be identified in the United States, England, and Russia where in the context of the biological warfare large-scale field tests have been carried out using extremely dangerous pathogens such as the anthrax (*Bacillus anthracis*), which render vast areas uninhabitable.

A fourth problem area arises from those substances produced by the activity of microorganisms such as metabolites and organic substances resulting from biosynthesis such substances frequently are more toxic than the pollutants found in the soil before treatment. The majority of these substances tend to be persistent and cannot be decomposed by microorganisms. Classic metabolites are for example aflatoxines, a group of metabolites produced by molds which are highly toxic and, moreover, are carcinogenic, as well as cyano-compounds, originating from Cyanophyceae, a group of about 2,000 one-celled algae.

A fifth problem area is represented by man-made pollution of soils and the ground water with organic substances.

A sixth problem area arises from a variety of insoluble inorganic substances such as mercury sulfide, red lead or arsenic trioxide which cannot be removed from the soil or the ground water by traditional methods or can only be removed at an extremely high cost.

The present invention can be considered based on the following prior art. Preparatory research and development has been performed by the immunochemistry in the course of the production and sterilization of sera. The basis of this research and development is electrolysis, i.e. the transportation of an electrolyte through a semipermeable membrane. As to electrodialysis, in general two diaphragms are required which enclose a central chamber containing a colloidal solution to be treated, whereas the electrodes are placed in the outer chambers. On the latter basis, German Patent No. DE 383 491 (Elektroosmose AG) discloses an arrangement comprising three chambers and electrodes of approx. 400 $cm^2$ which are intended to sterilize liquids or solids, the latter being saturated with a solution of sodium chloride, within 2 hours at a current of 10–12 A and a direct voltage of 60 V. In this apparatus, streptococci, staphylococci and pneumococci have been sterilized. Similar apparatus have also been applied in the German Patents DE 397 888, DE 150 328, DE 397 551, and DE 423 822. In these aforementioned patents the electric current was employed to cause the sterilization. The German Patents Nos. DE 463 333 and DE 383 481, however, evidenced that the effect of sterilization is not based on the effects of the electric current but on the effects of the weak hydrochloric acid generated by the dissociation of the solution of sodium chloride. An application of aforesaid techniques to the treatment of soils and/or the ground water are not yet known.

As to the remediation of soils, electrokinetic processes using two or more electrodes are described in U.S. Pat. Nos. 5,137,608 and 5,074,986, as well as in the European Patent EP 0 312 174 and in the German Patent DE 39 20 342. By the aforesaid electrokinetic processes pollutants such as soluble heavy metal compounds, and some polar organic substances, such as phenol, are simply transported to the electrodes. Most of the inorganic compounds will precipitate on the electrodes while the organic substances will accumulate close to the electrodes or be converted by electrode reactions.

This invention, however, by applying techniques such as pole reversal of the electric field and a low density of current, will prevent electrokinetic transportation of pollutants through the soil. Instead, the pollutants are treated in situ, i.e. mineralized by non-Faraday processes.

In my earlier U.S. Pat. No. 5,595,644, a process is described by which harmful materials are caused to decompose in situ by the generation of an ionization channel between electrodes via application of a voltage in the ground region so as to increase the conductivity of the ground region affected. The electric voltage is regulated by adjusting the current such that the energy supplied is equal to or greater than the electron affinity of the atoms making up the harmful materials in the treated ground region. In accordance with this patent, the harmful substances undergo oxidation by electron reactions.

In the German patent application No. DE 43 15 248, another method for the decontamination of soils has been described. Electrolytes are fed into the soil enabling electrolysis in combination with another electrolyte which, in the electric field between electrodes, produce ions that on their part will react with the pollutants so as to convert the pollutants into harmless substances.

Further prior art processes relate to electrochemical decomposition of pollutants in apparatus and equipment, such as indicated in the German patent applications DE 40 07 805, DE 36 00 772 or DE 40 13 068.

SUMMARY OF THE INVENTION

The purpose of this invention is to provide a method for the in situ sterilization of microorganisms, as well as for the mineralization of metabolites and/or other organic substances in situ by the conversion of organic substances mainly into carbon dioxide and water. This invention also provides for the in situ split up of insoluble inorganic substances to such an extent that in an aquatic environment these inorganic compounds can be mobilized as ions or colloids.

The present invention accordingly provides a method both for the in situ sterilization of microorganisms, and for the in situ electrochemical mineralization of metabolites and/or other organic substances and the split up of insoluble inorganic substances. This method provides two different treatments, one for the microorganism pollutants and one for the organic and inorganic pollutants. According to this invention, the sterilization of the microorganisms is effected by high electric current, and the in situ electrochemical decomposition of the organic and inorganic pollutants occurs as a result of soil particle polarization.

Typically, when there are microorganism pollutants present in a contaminated region of ground soil, as well as organic and inorganic pollutants, the electrodes (at least one pair) are incorporated into the ground soil in a selected orientation relative to the natural polarization of the soil particles in the ground soil region to be decontaminated. Voltage is then applied to the electrodes in order to establish a selected current intensity depending upon the resistivity and nature of the pollutants in order to first sterilize the microorganisms. While the microorganisms are being destroyed, the process of decomposition of the organic and inorganic pollutants by the soil particle polarization is beginning.

Once the microorganism pollutants have been sterilized, which typically takes 3 days or more, the voltage is adjusted to provide the requisite lower current intensity appropriate for the decomposition of the organic and inorganic pollutants over a much longer period of time necessary for this decomposition to take place, typically 30 to 150 days. If there are no microorganisms in the contaminated ground soil region, the voltage at the outset is selected to provide the requisite current intensity to adjust the natural polarization of the soil particles according to the desired decomposition of the organic and inorganic pollutants of the contamination.

Furthermore, it is presently believed based upon recent work described later on in this application that the electric current, which flows through the contaminated soil region by reason of the voltage impressed between at least one pair of in-ground electrodes in accordance with the present invention, causes a build up in the natural capacitance of the soil particles (and pollutant particles). When the capacitance of an individual particle or particles caused by this primary voltage and primary amperage become overloaded, the particles release the stored electrons in a sudden discharge at a higher voltage than the primary voltage, sometimes at a much higher voltage. It is now postulated that this discharge is effective in causing the electrochemical decomposition of the pollutants. We have found that the primary voltage can be preferably fine tuned in order to maximize the size and frequency of these electric discharges from the soil particles.

DESCRIPTION OF PREFERRED EMBODIMENTS

For purposes of clarification and differentiation of the present invention from the disclosures in the above referenced patents and patent applications, some definitions are required. In accordance with the current state of the art defined by electrochemistry, any and all electrochemical reactions basically must take place at or close to the electrodes. See D. Rahner, H. Gruenzig, Die Anwendung elektrochemischer Verfahren zur Sanierung kontaminierter Boeden—Stand und Probleme; in: Umweltbundesamt: Verfahren zur elektrochemischen Sanierung von Altstandorten, Berlin 1994 (The Application of Electrochemical Processes for the Electrochemical Remediation of Polluted Sites— State of the Art and Problems, in: Umweltbundesamt (editor): Processes for the Electrochemical Remediation of Polluted Sites, Berlin 1994). As a result of experiments and tests in the laboratory, bench mark tests and in field tests performed in connection with the present invention, a new knowledge differing substantially from the present state of the art has been developed. Taking into account the specific physical and chemical properties of soils, it has been discovered that in accordance with the present invention electrochemical reactions can take place on any and all individual soil particles. Soil (ground) is defined as a region comprising mineral soil particles, microorganisms, organic and inorganic particles of pollutants (all of them altogether are hereinafter referred to as soil particles) either in natural compaction or as refill. The mineral particles in general have particle sizes of approx. 0.001 mm to greater than 100 mm. The minerals in the chemical sense are not pure, but contain, with the exception of the noble gases, impurities built into the crystal lattices which almost cover all natural elements of the periodical system. A variety of these chemical elements are well known as catalysts.

Almost all natural soils contain water in the form of captive water and capillary water. This water is capable of conducting electrons since the water contains electrolytes. The determination of the electric conductivity of water is a standard method to determine the quality of the water. From hydrogeology it is known that almost all soil particles are surrounded by a hull of captive water. Within the framework of this invention we have detected that the hull formed by the captive water corresponds to the colloidal model developed by Nernst and Stern and that this hull can be defined as comprising two distinct layers of captive water with an overall thickness of approx. 1.1 to 3.15 $\mu$m (or approx. 200 molecular diameters). Furthermore, within the framework of the research on this invention we have detected that this captive water is the decisive prerequisite for the passage of an electric current through the soil. An additional doping of the ground water with electrolytes has proven not, or only marginally, to modify the parameters of the electric current.

The pollutants, also surrounded by a hydrate layer, in different ways are tied to the soil matrix. A part of the pollutants form colloids and can be mobilized within the capillary system of the soil, when the capillary system is saturated by water. Unpolar pollutants in general are hydrophobically adsorbed onto the soil particles. Polar substances such as phenol frequently are coordinated with the soil particles via the water layer forming a bridge or bridges which are frequently referred to as "metal-organic" coordinate bonds. The organic substances adsorbed or coordinated to soil particles which escape mobilization still need to be removed from the ground and the ground water as well.

Soils also represent a complicated geoelectric system. Natural electrical fields are regularly developed in soils for different reasons. Field tests evidenced dc voltages in between 5 mV and 1 V (measured between 2 electrodes at a distance of 1 meter), partly superimposed by vagabonding ac voltages up to 23 V. Furthermore, the ground partly is a strong capacitor with a capacitance between 5 and 30 $\mu F$.

Since natural electric fields are directed, almost all soil particles hold a stable bipolar electric charge. The electrical system of the soil particles again forms part of a wider natural electric field of the ground. Not only the electric polarization of the soil particles, but also the polarization of microorganisms at the interface between ground water and cell wall, is exploited for purposes of this invention. In contrast to equipment where the number of electrodes determines the number of cathodes and anodes, ground soil contains an almost infinite number of soil particles, which are charged on one side positively (anodically) and on the opposite side negatively (cathodically).

In distinction to hitherto known processes, the present invention is based on the geophysical phenomenon related to the polarization of the individual soil particles and the reinforcement of the already existing electrical fields in soils as well as in the ground water.

In our research we detected that the polarization of the soil particles and the formation of bipoles is connected with the so-called capacitor effect. In accordance with this effect, if the direction of the natural field and the direction of the electric current required for the remediation coincide, the capacitor effect causes an addition of the capacitor current of the soil to the intensity of current applied. On the other hand if the current required for the remediation of the soil is directed against the direction of the natural electric field, a subtraction of the currents will take place. A correct application of the current in strict compliance with this invention therefore superimposes the remediation current coincident with the natural electrical fields. In some circumstances, the generated electric field can be placed transversely to the natural electric field. In a field test using fine sands for the ground soil and at a direct voltage of 12 V the intensity of current devoted to the remediation totaled 5.6 A and the capacitor current was 4.4 A. Where there was coincidence of the electric fields, both artificial and natural, the amperage added up to 10 A; while in the opposite case where the remediation current was opposite to the natural electric field, the amperage by substraction totalled 1.2 A.

In the event that an electric current is applied to the aquatic system of ground soils, the redox reactions must take place at any and all soil particles. Electrolysis of water forms part of the system of the redox reactions. Contrary to all hitherto known processes, the places where redox reactions take place are predominantly not the electrodes but any and all soil particles. Subsequently, we determined that applying a dc current of at least 1.68 V/m, water electrolysis took place, thus providing the required agents for oxidation and reduction to any and all of the individual soil particles. Other reactions related to the decomposition of pollutants are performed by hydrolysis, again supported by catalysis. The hydrolysis of benzene may serve as an example according to the following reactional equation:

$$C_6H_6 + 12H_2O \rightarrow 6CO_2 + 30H^+ + 30e^-$$

The sequences of the stepwise decomposition of organic pollutants has been identified on the basis of the analysis of more than 2,100 GC-MS-chromatograms organized in 400 series of measurement. The decomposition processes can be defined according to the following stepwise sequence:

a. macromolecular aliphates or polycyclic compounds are cracked first at preferential breaking points. $C_{36}$ changes to $C_{12}$, thereafter to $C_6$ and $C_3$, polycyclic aromatic hydrocarbons (PAH) break up the BTEX level;

b. simultaneous oxidation of the hydrocarbons is carried out forming alcohols;

c. then to aldehydes and/or ketones;

d. then to carboxylic acids; and e. the carboxylic acids are finally oxidized to $CO_2$ and water.

In detail, we have determined that in the course of decomposition of petroleum hydrocarbons (DIN 38409 H18; aliphatic chains) we identified processes related to the reduction of compounds, such as fractioning of the aliphatic chains, as well as processes related to the oxidation of compounds, such as formation of carboxylic acids. These processes according to steps a, b, c, d, and e above, can be illustrated as follows:

The decomposition of monoaromates can be compared with the decomposition of petroleum products. The decomposition of a monoaromate, such as toluene, follows the sequence of an aromatic alcohol (b), which is oxidized to an aldehyde (c) which on its part will be oxidized to benzoic acid (d) which again will be decomposed to carbon dioxide and water. This decomposition can be illustrated, as follows:

As far as PAH are concerned, by proper application of the invention, the multiple ring compounds will be cracked to the level of naphtalene (two ring compound) and/or monaromates. Thereafter the above described processes of oxidation (b, c, d, and e) will take place, as illustrated below:

In the course of remediation, the concentration of naphtalene and BTEX initially will rise prior to the oxidation of PAH to carbon dioxide and water.

As far as chlorinated hydrocarbons are concerned, including volatile, semi-volatile and non-volatile chlorinated organic compounds, a gradual dehalogenation (reduction) will take place. Having performed remediation on non-volatile chlorinated hydrocarbons, such as hexachloro-butadiene, we determined that chlorinated compounds were reduced to the level of aliphates (petroleum products). The aliphates identified were then subsequently mineralized by processes of oxidation as described above. In laboratory tests, the dehalogenation of volatile chlorinated solvents has been determined according to the following steps:

perchloro-ethylene, trichloro-ethylene, dichloro-ethylene (cis-, trans-), monochloro-ethylene and a subsequent oxidation of ethylene to carbon dioxide, water and chlorides, which can be illustrated as follows:

Also other cyclic chloro-organic compounds are first dehalogenated and subsequently mineralized via processes of oxidation. In bench mark tests using -lindane, at the end of the test only traces of chloro-benzene and phenol (most probably the remainder of the emulsifier) have been identified.

The decomposition of nitric compounds, such as acetonitrile is accomplished via hydrolysis of primary amides to acetic acid. Subsequently the organic acid is mineralized. This decomposition can be illustrated, as follows:

While decomposing amines, we determined an intermediate step in the formation of azo- and triazo-compounds. These latter products were subsequently decomposed to pure nitrogen ($NO_x$ or $NH_x$ were not detected), carbon dioxide and water.

Other nitrocompounds such as nitroaromates, are converted in a preliminary step into azocompounds such as azobenzene. This type of reduction is applied by the chemical industry in the synthesis of azoaromates. From azobenzene, nitrogen will be split off forming now benzene. Benzene will then be mineralized as describe above. This decomposition is illustrated as follows:

By interface and redox reactions, it is possible in accordance with the present invention to decompose even insoluble inorganic compounds which are converted into either soluble or colloidal compounds. The mobilization and precipitation of these compounds, however, are not the subject of our present invention.

The alkaline metals, alkaline earth metals, aluminum, silicon, as well as heavy metals such as copper, iron, and nickel, which are tied in the crystal lattices of the soil particles or dissolved in the groundwater may serve as catalysts which assist the processes related to the decomposition of the pollutants, while at the same time serving to reduce considerably the activating energy required for the reactions. Hence, it has been found that even compounds requiring a high activating energy can be decomposed under the influence of the energy parameters used by the present invention. The minerals and/or heavy metals in the soil and the groundwater also react directly with the compounds and metabolites respectively serving as agents in the redox reactions and in the decomposition of the organic compounds. In strongly eluted soils, it is known to inject soluble, dispersed catalysts into the soil, preferably Fe, Mn and Ni catalysts, in order to promote the redox and/or hydrolysis reactions.

In a test performed in a container containing approximately 10 metric tons of polluted soil, the extent of the sterilization of microorganisms was examined. Prior to the bench mark test, the polluted soil was treated by a mix of microorganisms. By biodegradation a significant quantity of metabolites was produced including acetals, aldehydes, ketones, amines and amides. In compliance with German practice and prior to the intended disposal of the soil on a German hazardous waste deposit, sterilization of the soil was required. By applying a current of 20.83 $A/m^2$ of electrode surface and at 60 V dc, the soil was sterilized completely after 72 hours. After sterilization of the soil, electrochemical treatment of the soil in accordance with the present invention continued without changing the parameters of the electric current. Using a GC-mass spectrometer (GC-MS), it was determined that the concentration of so-called natural substances such as alanine, carotenal, cholestene, conanine-amine, dinorgammaceran were reduced after 20 days of electrochemical treatment to less than 11% of the starting concentration. The electrochemical treatment of the soil continued for another 43 days with the objective to mineralize the remaining metabolites. At the end of the above mentioned period, we proved by GB-MS that pollution by metabolites has been reduced by about 96%.

In more recent work with the present invention to decompose organic and inorganic pollutants in ground soils, we have observed certain phenomena which appear to be contradictory to the earlier understanding of the art defined by electrochemistry for geoelectric applications. More specifically, it has been observed that the time for remediation for such organic and inorganic pollutants appears to be independent of the contaminant concentration. Further, according to the current state of the art in electrochemistry, the extent of the reactions related to the decomposition of the pollutants is dependent largely on the intensity of the primary current applied to the soil via the at least two electrodes. We have found, however, that the decomposition of the pollution may not be dependent directly on the primary intensity of the electric current. There may be secondary effects generated by the capacitance of individual soil particles. This capacitance as described hereinafter can provide a far higher voltage and amperage for purposes of initiating and performing electrochemical reactions of pollutants than the primary voltage and amperage applied to the soil particle via the electrodes. In fact, we have experienced generator burn out in circumstances which suggest that the burn out has been caused by feedback from the soil during the initial stages of the voltage application. Finally, it is possible that the process of the present invention is not dependent upon catalysts present in the soil, as would be expected according to conventional geoelectric theory.

In view of these observed phenomena in the practice of the present invention, a new hypothesis for the functioning of the soil particles subjected to the impressed voltage field and electric current for the present invention is here postulated. While not intending to be legally bound by this therothetical explanation, it is now believed that each of the soil particles acts as its own capacitor. Once the capacitance of an individual particle is overloaded, the particle will discharge electrons from its core. Moreover, it is postulated that this electron discharge is quite high considering the very small size of the soil particles, and can be on the order of 4 or 5 volts when overcharged for a particle having a size on the order of 1 mm in diameter. Moreover, this high electric discharge by the soil particles subjected to the electric field in accordance with the present invention occurs at a very high rate. It is therefore believed that this high level and rate of electric discharge by the affected particles is instrumental in promoting the redox reactions to effect decomposition of the contaminants.

Therefore, in accordance with the present invention, the voltage applied between any pair of electrodes for a region of soil to be treated should be regulated so that the level of electric current passing to the soil particles is controlled. The voltage is selected in order to optimize the amplitude and frequency of the electric discharges or spikes emitted by the soil particles which have become subject to over capacitance. In particular, it is desirable to operate the present invention at an optimum voltage where the amplitude and frequency of the spikes, or discharge from the soil particles, are maximized. In other words, the method is carried out to maximize the capacitive loading of the soil particles in order to maximize the discharge from the particles at a high level and a high frequency, which in turn speeds up the redox reactions which decompose the pollutants. Inasmuch as these discharges or spikes are taking place at the soil interface, the redox reactions are also taking place in situ at the soil particle interfaces.

Figure 1:
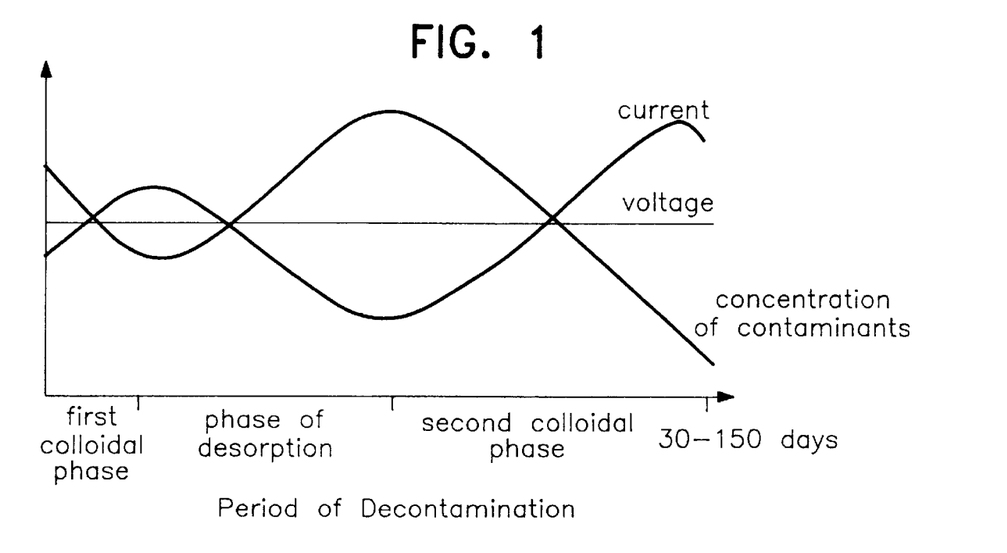
FIG. 1 is a graph illustrating the in situ remediation of unpolar substances in ground soil in accordance with the present invention with current, voltage and concentration of contaminants plotted against the days of remediation.
Figure 2:
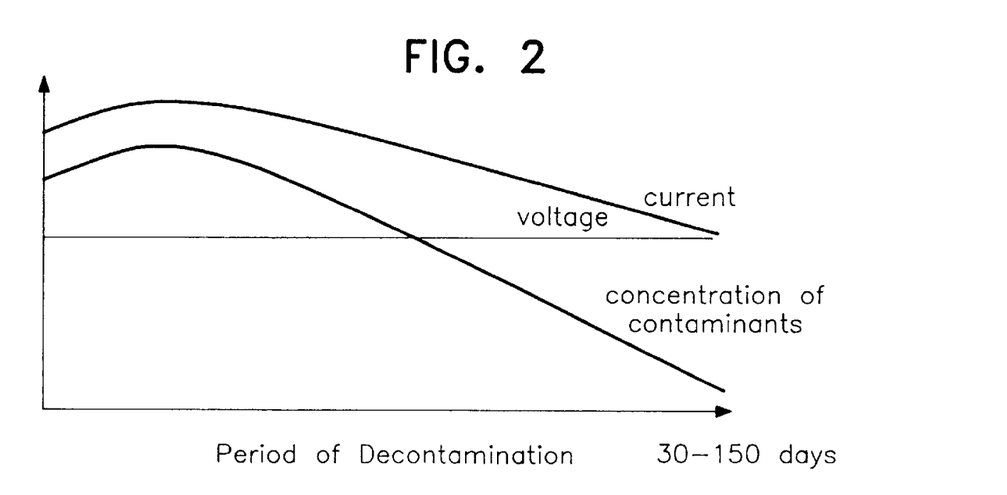
FIG. 2 is a graph illustrating the in situ remediation of polar substances in ground soil in accordance with the present invention with current, voltage and concentration of contaminants plotted against the days of remediation.

The development of the concentration of pollutants during the electrochemical remediation of the soil and of the ground water is characterized by typical curves which reflect the parameters of the electric current applied. The curves illustrated in FIGS. 1 and 2 depict regularities in the in situ remediation of the ground and are used for purposes of the control of the processes. FIG. 1 depicts the development of unpolar substances such as aliphates and PAH. Bearing in mind that the voltage is kept constant, in the first phase of remediation taking 3 to 20 days, the intensity of current will increase and respectively the specific resistivity of the soil will decline; in parallel, the concentration of pollutants will also decline. This phase is called "first colloidal phase" since colloidal pollutants within the capillary system of soils are mineralized. The second phase will take about 20 to 40 days. Again, with the voltage being kept constant, the intensity of the current will decline by slightly more than 50%, and the specific resistivity will increase correspondingly. The concentration of pollutants will also increase, partly beyond the initial values. This phase is denominated the "phase of desorption" since the pollutants adsorbed by or coordinated with the soil particles are desorbed and are becoming capable of chemical analysis. The third phase takes about 5 to 20 days. The desorbed pollutants, being converted into colloids will now be mineralized. Again, with the voltage kept constant, the intensity of the current will increase and the specific resistivity of the soil will decline. This phase is called the "second colloidal phase". The end of remedial work is indicated, again with the voltage being kept constant, by a drop in the intensity of the current and by an increase in the specific resistivity of the soil to a level comparable to the specific resistivity of similar unpolluted soil.

Another illustration of the electric parameters of the present invention is depicted in FIG. 2 which relates to polar substances. In this case, again with the voltage kept constant, the intensity of current increases slightly and more or less in a linear pattern. After 40 to 60 days, the parameters will decline corresponding to the extent of decomposition of the pollutants. The end of remedial work is indicated when the comparative level of the specific resistivity of a similar unpolluted soil is reached. The break related to the intensity of current indicating the end of the second colloidal phase in the treatment of unpolar substances can be observed to a lesser extent. The amplitude of the changes related to the intensity of current depends on the type and the concentration of pollutants; the amplitude may be 50% and more compared with the intensity of the current at the beginning of the remediation.

We observed in laboratory tests when using inert electrodes that the pH of the soil to be treated changes dramatically during remediation. More specifically, the pH declines in the area of the anode and rises in the area of the cathode. In the field, however, when proceeding properly in accordance with this invention, the pH will stabilize between 6.5 and 7.8, an effect which is independent for the pH encountered before treatment begins. In field tests, we found that the pH of the soil and the ground water can be controlled by the selection of appropriate electrode materials. For this purpose, carbon steels and/or low alloyed steels have proven to be advantageous.

The layout of the electrodes for the remediation can be described as follows. At least two electrodes are required. The shape of the electrodes can be either hollow, such as a tube, sheet metal, or a solid mass. Depending on the working depth, the electrodes may be placed into the soil vertically or horizontally. The distance between electrodes depends on the topographic and geoelectric conditions of the site including existing buildings. Preferably, the distance between electrodes should be on the order of 6 to 30 meters, and more in the event of circumstances of a special case.

For larger sites, an arrangement comprising a plurality of electrodes can be used, connected together in pairs of electrodes each comprising an anode and a cathode. In order to cover the complete site, the formation of pairs of electrodes will require a double connection of electrodes, with the exception of the outer electrodes as illustrated hereinafter with anode=(A); cathode=(K). For example, two rows of electrodes could be connected as follows:

A<–>K<=>A<=>K<–>A  (row 1)

A<–>K<=>A<=>K<–>A  (row 2)

in which <=> means a double connection of the corresponding electrode and <–> a single connection.

The wiring of the electrodes in a multiple electrode arrangement can either be in a row, with a unipolar connection of the corresponding electrodes, or can be carried out by cross focussing electric fields formed by two or more pairs of electrodes in which the paths of the electric currents cross over each other. The connecting arrangement essentially depends on the geoelectric conditions of the site and the concentration and type of pollutants in the soil as well as on other parameters of the site to be treated.

Further, the electricity supply system of the electrodes should strictly be separated from the main source of electric power by any suitable device, such as, but not limited to, a separating transformer.

The minimum dc voltage for one pair of electrodes should be in the range of 0.4 V dc to 2 V dc, preferably 1.68 V dc, per meter of electrode distance per pair of electrodes. Depending on the type of soil, the water content and the degree of pollution, a voltage drop may occur locally in the vertical direction, i.e. with the depth. This voltage drop should be compensated by increasing the voltage.

A direct pulse voltage, a direct current, but also a frequency modulated ac, are appropriate to perform the above described electrochemical reactions.

Preferably, the potential related to a pair of electrodes is strictly to be galvanically separated from the others.

Preferably, the polarity within a pair of electrodes should be periodically reversed, the timing being determined depending on the direction and strength of the natural electric fields, unless the subtraction of the capacitor current of the soil contradicts the reversing. The reversing is to be performed without potential on the contactors. This means that there is no voltage, as well as no current, applied to the contactor. This contactor is driven by an auxiliary voltage. Thereby short circuits and sparking can be avoided.

The surface of electrodes should be maximized in relation to their length.

The electrode material should preferably be a carbon steel, but also, if desired, other electrically conductive material can be used. When incorporating the electrodes into the ground, the open space dug around the electrodes and the ground should be refilled with sand or gravel having a particle size equal to or smaller than the average particle size of the adjacent ground being treated. Further, we determined that the minimum moisture content of the ground, determined as capillary water, should be at least 6%. If the minimum moisture is not met in the ground, the soil should preferably be moistened by any appropriate method known in the art. As far as horizontal electrodes are concerned, the humidification of the soil should be performed preferably via a dispensing device placed on or attached to the electrode.

The intensity of the electric current required to sterilize the soil and the ground water depends on the genus of the microorganisms to be treated. We determined that preferably the intensity of current should range between 20 A and 250

A per m² surface of electrode. The duration of the treatment depends on the genus of microorganisms to be treated and should take at least 2 hours. As far as the mineralization of organic substances and the treatment of insoluble inorganic substances is concerned, the amperage preferably should range between 1 A and 20 A per square meter surface of electrodes.

Figure 3:
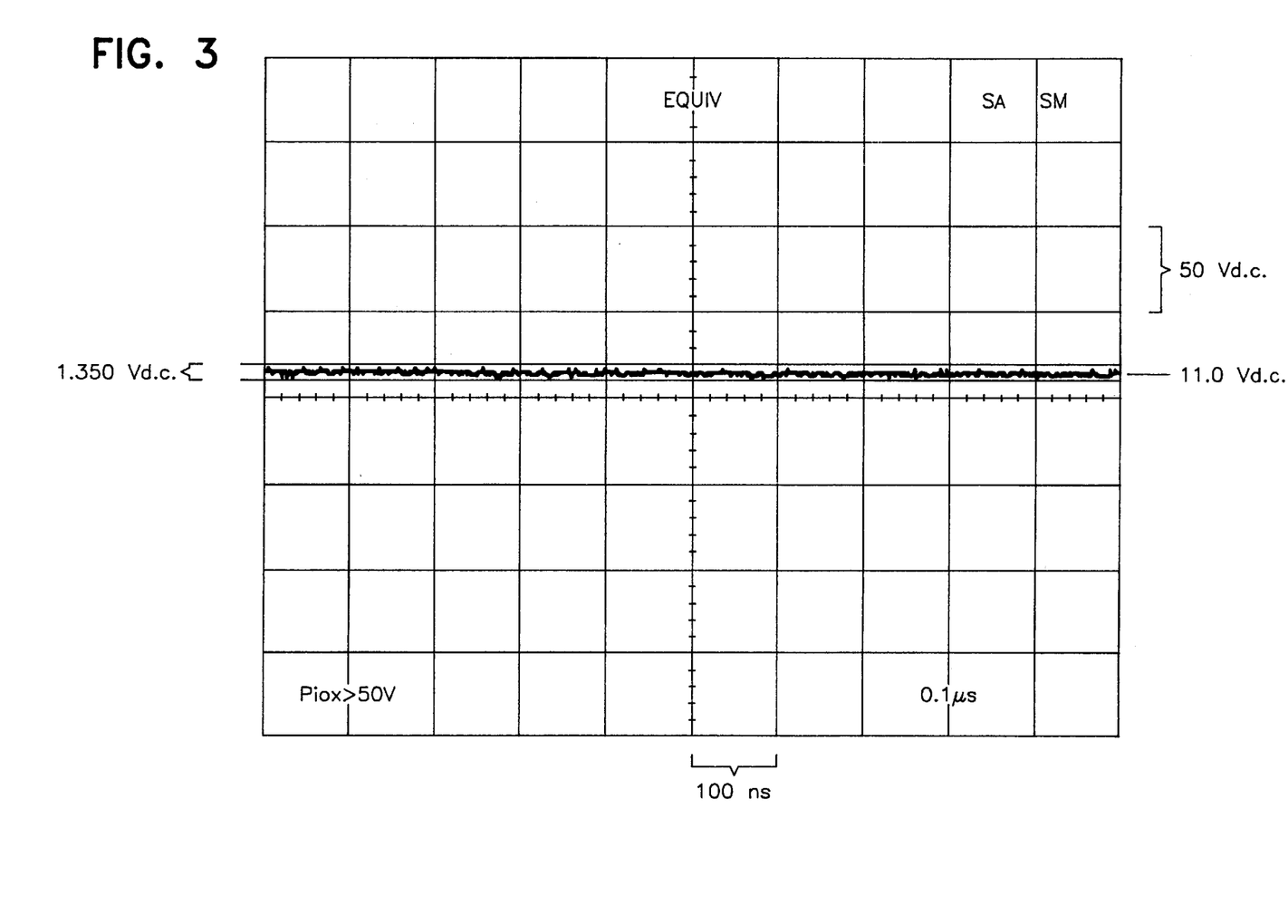
FIG. 3 is a schematic oscillogram illustrating an ultrasensitive oscilloscope measurement of the voltage applied across a pair of electrodes in which the selected voltage is preferred and the spikes in the curve illustrate a desirable amplitude and frequency of the voltage discharge from soil particles subjected to electric current in accordance with the present invention.

As stated above, the voltage applied between any pair of electrodes in accordance with the present invention should preferably be controlled in order to optimize the amplitude and frequency of the electric discharges emitted by the soil particles due to over capacitance. FIG. 3 depicts an oscillogram for an electrolytic system in accordance with the present invention performed at a base voltage of 11 volts dc applied onto a pair of cylindrical electrodes having a length of 8,000 mm, a diameter of 720 mm and installed at a distance of 9,000 mm from each other. Each individual square of the oscillogram shown in FIG. 3 equals 100 nanoseconds (ns) across the X-axis, or horizontal direction, and 50 volts, along the Y-axis, or vertical direction. The oscillogram shows a noise, i.e. a series of spikes, which overlay the 11 volt baseline. A frequency cannot be detected, and no wave length nor sine wave can be identified. Each spike, however, illustrates the release of voltage by individual capacitors, and it is postulated that the individual soil particles represent these capacitors in accordance with the present invention. As shown in FIG. 3, the amplitude of the spikes total approximately 1.350 volts, and in one microsecond ($\mu s$) on the order of 150 to 200 spikes occur. It is believed that this represents a maximum, or near maximum, amplitude and frequency for the spikes, or electric discharge from the soil particles. Hence, a base voltage of 11 volts dc is at or near the optimum voltage for this electrolytic system.

Figure 4:
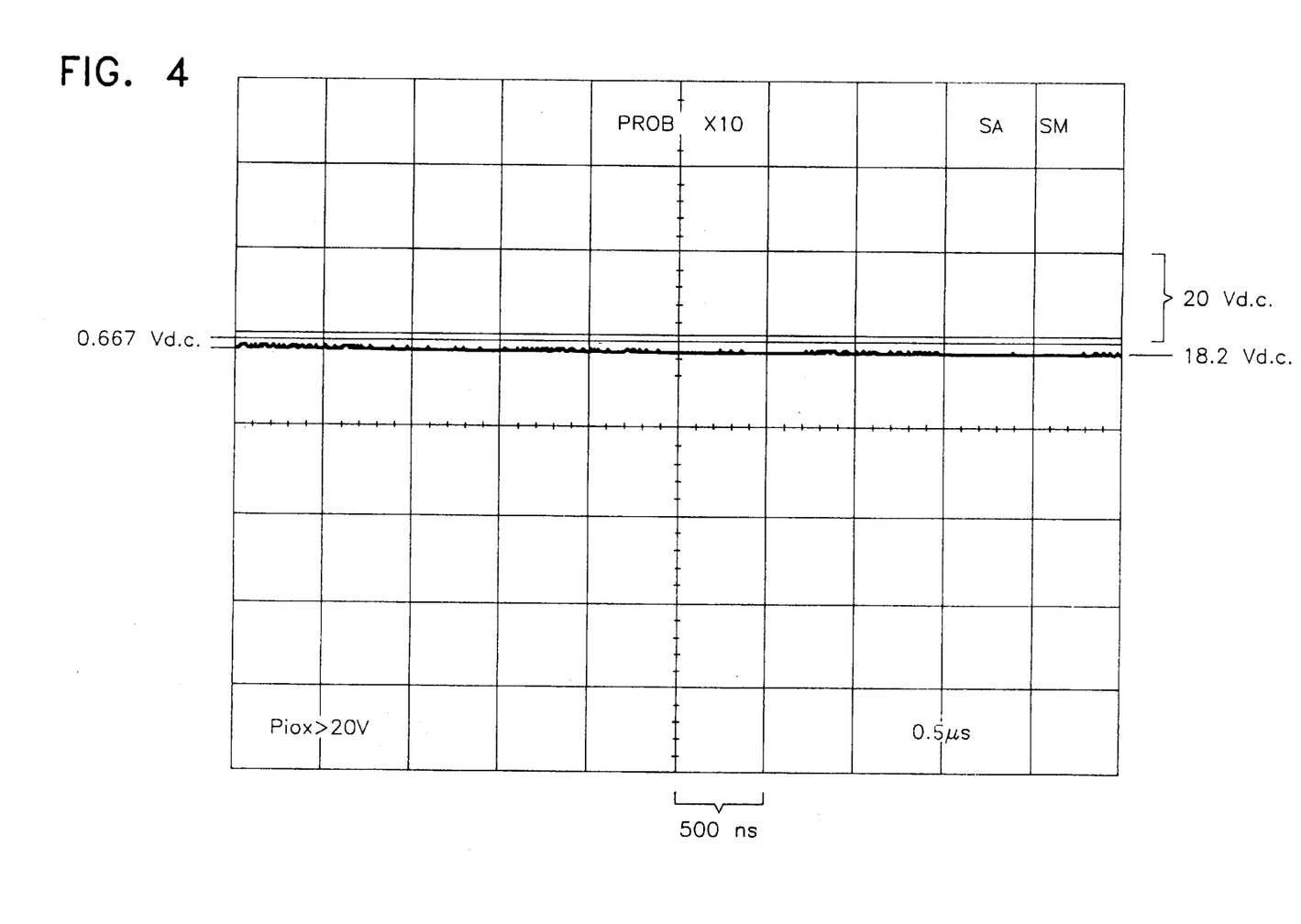
FIG. 4 is a second schematic oscillogram illustrating an ultrasensitive oscilloscope measurement of the voltage applied across a pair of electrodes in which the selected voltage is acceptable, but not preferred, and the spikes in the curve illustrate a different amplitude and frequency of the voltage discharge from soil particles subjected to electric current in accordance with the present invention.

FIG. 4 depicts a second oscillogram for the same system as described above for FIG. 3 in carrying out the present invention, except that the base voltage was increased to a level of 18.2 volts dc. Each square of the oscillogram of FIG. 4 represents 500 nanoseconds (ns) along the X-axis and 20 volts dc along the Y-axis. As will be seen, the number of spikes or electric discharges per microsecond ($\mu s$) has been reduced from 150 to 200 in FIG. 3 to about 4 spikes or discharges in FIG. 4. Further, the amplitude of the spikes has decreased from about 1.350 volts dc in FIG. 3 to about 0.667 volts dc in FIG. 4. In view of the significant reduction in the amplitude and frequency of the spikes, or electric discharges, the 18.2 volts dc is not a preferred voltage for this system.

Based upon our work to date, it is believed that the lower amplitude and frequency observed at the higher baseline voltage, i.e. 18.2 volts dc, are caused by a partial breakdown of the dielectrics at the interface between the soil particle and the water hull attributable to an over dimensioned tension. The effects of capacitance, i.e. an increased voltage for purposes of providing the activating energy, and reaction energy, required for the performance of the redox reactions, is thereby reduced. In contrast, the lower voltage, i.e. 11.0 volts dc, represents a better voltage for the electric parameters to be applied to the electrodes for this example in accordance with the present invention.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A method for sterilizing microorganisms or decomposing organic and inorganic pollutants or both in a contaminated ground region of soil containing water and soil particles having a natural polarization and capacitance, which comprises:
    (a) incorporating at least one pair of electrodes into the soil;
    (b) applying to the electrodes a voltage of at least 0.4 V per meter of electrode distance per pair of electrodes to additionally increase by a generated electric field said natural polarization and capacitance of the soil particles thereby effecting processes of cathodic reduction at negatively charged interfaces of the soil particles and simultaneously effecting processes of anodic oxidation at positively charged interfaces of the soil particles; and
    (c) generating agents for said anodic oxidation and said cathodic reduction by water electrolysis from the water.

2. A method according to claim 1, wherein said increase of said natural capacitance of said soil particles is sufficient to cause electric discharges from said soil particles.

3. A method according to claim 2, wherein said voltage is selected in order to maximize the capacitance loading of said soil particles and maximize the electric discharge from any particle when its capacitance is overloaded.

4. A method according to claim 2, wherein said voltage is selected to increase the amplitude and frequency of the electric discharges from any said soil particles.

5. A method according to claim 2, wherein said electric discharge enhances the redox reactions of said contaminants in situ at interfaces of said soil particles to decompose said contaminants contained in said region of ground soil.

6. A method according to claim 1, wherein redox reactions at the interfaces of said soil particles effect a mineralization of said organic compounds and a splitting up of insoluble inorganic compounds.

7. A method according to claim 1, wherein said direct current is applied to an intensity ranging from 1 A to 20 A per square meter of electrode surface for purposes of mineralization of organic compounds and split up of insoluble inorganic compounds.

8. A method according to claim 1, wherein said direct current is applied to an intensity ranging from 20 A to 250 A per square meter of electrode surface for purposes of sterilization of microorganisms.

9. A method according to claim 1, wherein the generated electric field substantially coincides with the natural polarization of said soil particles.

10. A method according to claim 1, wherein the generated electric field is generally transverse to the natural polarization of said soil particles.

11. A method according to the claim 1, wherein the voltage drop in the ground between a pair of electrodes varying with the depth is equalized by an increase of the overall voltage.

12. A method according to claim 1, wherein a direct current or a pulsing direct current or a frequency modulated alternating current is applied.

13. A method according to claim 1, wherein the electricity supply system of the electrodes is isolated from the main source of electric power.

14. A method according to claim 1, wherein multiple pairs of electrodes are incorporated and the potentials of said pairs are segregated from each other.

15. A method according to claim 1, wherein the electrode material is a carbon steel or a low alloyed steel.

16. A method according to claim 1, wherein the electrodes are incorporated into the soil either horizontally or vertically at a distance of about 6 meters to about 30 meters.

17. A method according to claim 1, wherein said direct current is applied to an intensity ranging from 20 A to 250 A per square meter of electrode surface for purposes of sterilization of microorganisms.

18. A method according to claim 1, wherein the generated electric field is generally transverse to the natural polarization of said soil particles.

19. A method for the treatment of organic and inorganic contaminants in a region of ground soil containing soil particles and ground water which comprises applying to at least one pair of electrodes extending into said ground soil region a voltage of at least 0.4 V per meter of electrode distance per pair of electrodes and passing a direct current through said soil particles in order to alter the capacitance of said soil particles and cause an electric discharge from soil particles when their capacitance is overloaded.

20. A method according to claim 19, wherein said voltage is selected to maximize the capacitive loading of said soil particles and maximize the electric discharge from any soil particle when its capacitance is overloaded.

21. A method according to claim 19, wherein said voltage is selected to increase the amplitude and frequency of the electric discharges from any said soil particles.

22. A method according to claim 19, wherein said electric discharge enhances the redox reactions of said contaminants in situ at interfaces of said soil particles to decompose said contaminants contained in said ground soil region.

23. A method according to claim 19, wherein minerals and metals tied in the crystal lattices of said soil particles or dissolved in said ground water serve as catalysts in said redox reaction.

24. A method according to claim 19, wherein agents for said redox reactions are generated by water electrolysis from said ground water.

25. A method according to claim 19, wherein the electricity supply system of the electrodes is completely isolated from the main source of electric power.

26. A method according to claim 25, wherein the direct current from said generated electric field increases the natural polarization of said soil particles.

27. A method according to claim 19, wherein said direct current is applied to an intensity ranging from 1 A to 20 A per square meter of electrode surface.

28. A method according to claim 19, wherein the voltage applied to the electrodes extending into said ground soil region generate an electric field substantially coincident with a natural electric field of said ground soil.

29. A method according to claim 19, wherein the voltage applied to the electrodes extending into said ground soil region generate an electric field substantially transverse to a natural electric field of said ground soil.

30. A method according to claim 19, wherein multiple pairs of electrodes extend into said ground soil region and the potential of said pairs are segregated from each other.

31. A method according to claim 19, wherein in a multiple electrode arrangement the electrodes are switched by row with unipolar connection of the electrodes.

32. A method according to claim 19, wherein the poles of each pair of electrodes are periodically reversed.

33. An in situ method for removing contaminants in ground soil having a moisture content of not less than 6%, which comprises:

(a) determining a natural electric field of said ground soil containing said contaminants;

(b) incorporating at least one pair of electrodes into said ground soil so that an electric field generated by said electrodes will substantially coincide with said natural electric field of said ground soil;

(c) applying a voltage to the electrodes to generate said electric field and pass a direct current through soil particles of said ground soil to cause an electric discharge from said soil particles and effect simultaneous reduction at negatively charged interfaces of the soil particles and oxidation at positively charged interfaces of the soil particles; and (d) generating agents for said reduction and oxidation by water electrolysis from said moisture content in said ground soil.

34. A method according to claim 33, wherein said applied voltage is at least 0.4 V per meter of electrode distance per pair of electrodes.

35. A method according to claim 34, wherein said direct current is applied to an intensity ranging from 1 A to 20 A per square meter of electrode surface for mineralization of organic compounds and split up of insoluble inorganic compounds contained in said contaminants.

36. A method according to claim 33, wherein multiple pairs of electrodes are incorporated into said ground soil and the potentials of said pairs are segregated from each other.

37. A method according to claim 33, wherein the poles of each pair of electrodes are periodically reversed.

38. An electrochemical method for the treatment of contaminants in a region of ground soil containing soil particles having a natural capacitance which comprises passing a direct current through said soil particles to increase said natural capacitance of said soil particles sufficiently to cause electric discharges from said soil particles.

39. An electrochemical method according to claim 38, wherein said voltage is selected in order to maximize the capacitance loading of said soil particles and maximize the electric discharge from any particle when its capacitance is overloaded.

40. An electrochemical method according to claim 38, wherein said voltage is selected to increase the amplitude and frequency of the electric discharges from any said soil particles.

41. An electrochemical method according to claim 38, wherein said electric discharge enhances the redox reactions of said contaminants in situ at interfaces of said soil particles to decompose said contaminants contained in said region of ground soil.

42. An electrochemical method according to claim 38, wherein said electric discharge from said soil particles effects reduction of contaminants in situ at negatively charged interfaces of said soil particles and oxidation of contaminants in situ at positively charged interfaces of said soil particles to decompose any organic contaminants and inorganic contaminants contained in said region of ground soil.

43. A method according to claim 40, wherein the electrodes are incorporated into the soil either horizontally or vertically at a distance of about 6 meters to about 300 meters.

44. An electrochemical method according to claim 38, wherein said direct current is generated by applying to at least one pair of electrodes extending into said ground soil a voltage of at least 0.4 V per meter of electrode distance per pair of electrodes.

45. An electrochemical method according to claim 38, wherein said direct current is applied to an intensity ranging from 1 A to 20 A per square meter of electrode surface for mineralization of organic compounds and split up of insoluble inorganic compounds contained in said contaminants.

46. An electrochemical method according to claim 38, wherein the voltage applied to the electrodes generates an electric field substantially coincident with the natural polarization of said soil particles.

47. A method for sterilizing microorganisms or decomposing organic and inorganic pollutants or both in a contaminated ground region of soil containing water and soil particles, which comprises:
(a) incorporating at least one pair of electrodes into the soil;
(b) applying to the electrodes a voltage of at least 0.4 V per meter of electrode distance per pair of electrodes to simultaneously effect process of cathodic reduction at negatively charged interfaces of the soil particles and processes of anodic oxidation at positively charged interfaces of the soil particles; and
(c) generating agents for said cathodic reduction and said anodic oxidation by water electrolysis from the water.

48. A method according to claim 47, wherein redox reactions at the interfaces of said soil particles effect a mineralization of said organic compounds and a splitting up of insoluble inorganic compounds.

49. A method according to claim 47, wherein said direct current is applied to an intensity ranging form 1 A to 20 A per square meter of electrode surface for purposes of mineralization of organic compounds and split up of insoluble inorganic compounds.

50. A method according to claim 47, wherein the generated electric field substantially coincides with the natural polarization of said soil particles.

51. A method according to the claim 47, wherein the voltage drop in the ground between a pair of electrodes varying with the depth is equalized by an increase of the overall voltage.

52. A method according to claim 47, wherein a direct current or a pulsing direct current or a frequency modulated alternating current is applied.

53. A method according to claim 47, wherein the electricity supply system of the electrodes is isolated from the main source of electric power.

54. A method according to claim 47, wherein multiple pairs of electrodes are incorporated and the potentials of said pairs are segregated from each other.

55. A method according to claim 47, wherein the electrodes are incorporated into the soil either horizontally or vertically at a distance of about 6 meters to about 30 meters.

56. A method according to claim 47, wherein said soil particles have a natural polarization and capacitance and applying said voltage to the electrodes increase said natural polarization and capacitance of the soil particles to thereby effect said redox reactions.

57. A method according to claim 56, wherein said increase of said natural capacitance of said soil particles is sufficient to cause electric discharges from said soil particles.

58. A method according to claim 57, wherein said voltage is selected in order to maximize the capacitance loading of said soil particle sand maximize the electric discharge from any particle when its capacitance is overloaded.

59. A method according to claim 57, wherein said voltage is selected to increase the amplitude and frequency of the electric discharges from any said soil particles.

60. A method according to claim 57, wherein said electric discharge enhances the redox reactions of said contaminants in situ at interfaces of said soil particles to decompose said contaminants contained in said region of ground soil.

* * * * *